W. G. LAIRD.
APPARATUS FOR THE MANUFACTURE OF GAS.
APPLICATION FILED MAR. 1, 1909.

1,014,654.

Patented Jan. 16, 1912.

7 SHEETS—SHEET 2.

W. G. LAIRD.
APPARATUS FOR THE MANUFACTURE OF GAS.
APPLICATION FILED MAR. 1, 1909.

1,014,654.

Patented Jan. 16, 1912.
7 SHEETS—SHEET 5.

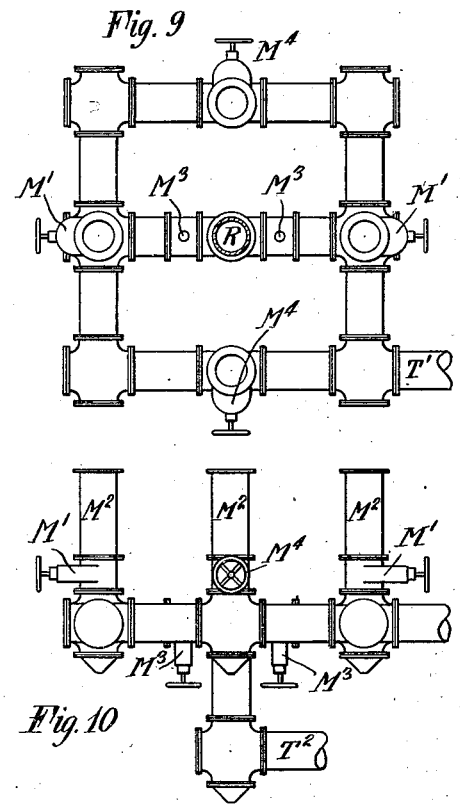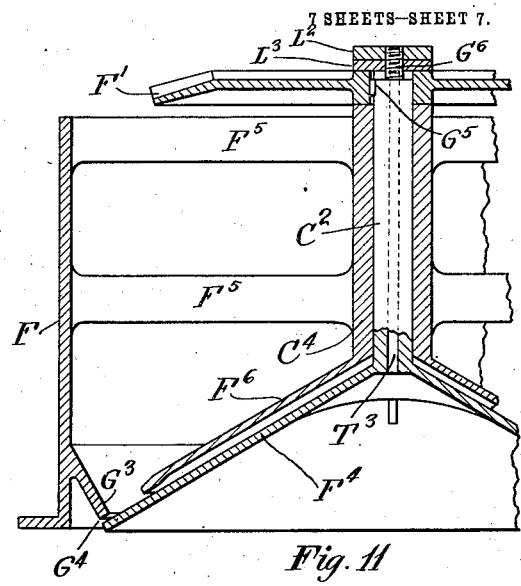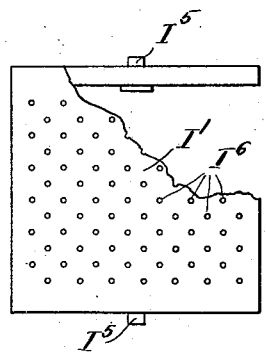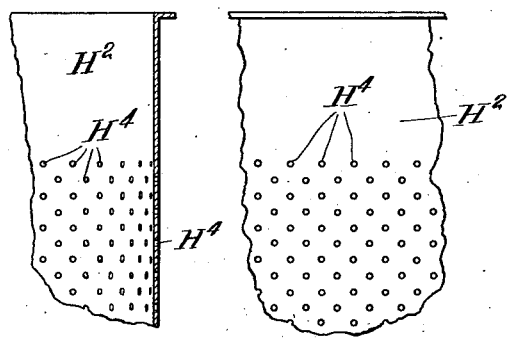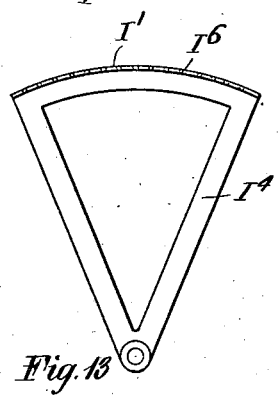

UNITED STATES PATENT OFFICE.

WILBUR G. LAIRD, OF NEW YORK, N. Y., ASSIGNOR TO THE IMPROVED EQUIPMENT COMPANY, OF NEW YORK, N. Y., A CORPORATION OF COLORADO.

APPARATUS FOR THE MANUFACTURE OF GAS.

1,014,654.  Specification of Letters Patent.  Patented Jan. 16, 1912.

Application filed March 1, 1909. Serial No. 480,614.

*To all whom it may concern:*

Be it known that I, WILBUR G. LAIRD, a citizen of the United States, and a resident of the borough of Manhattan, city, county, and State of New York, have invented certain new and useful Improvements in Apparatus for the Manufacture of Gas, of which the following is a specification, accompanied by drawings.

This invention relates to apparatus for the manufacture of gas from the distillation of crushed coal, sawdust and other materials, or from any suitable liquid hydrocarbon such as oil or tar.

The object of the invention is to improve upon apparatus for the manufacture of gas and enable the distillation to be carried on in a continuous manner with the greatest economy.

According to this invention some of the particles subjected to distillation are heated by direct contact with a heated surface and all of them are very uniformly and regularly heated also by contact with a heated gas, and by radiation.

Figure 1:
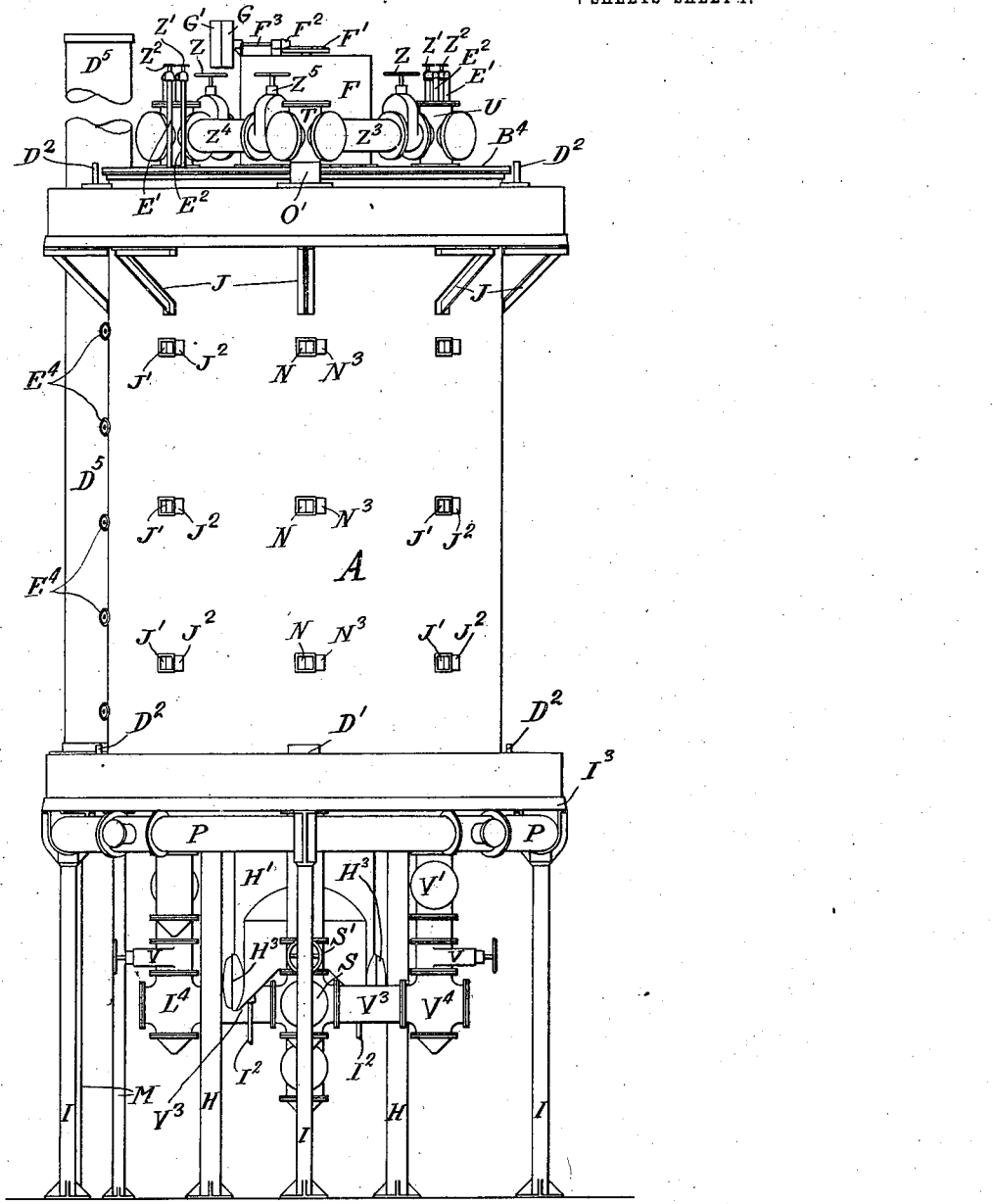
Figure 2:
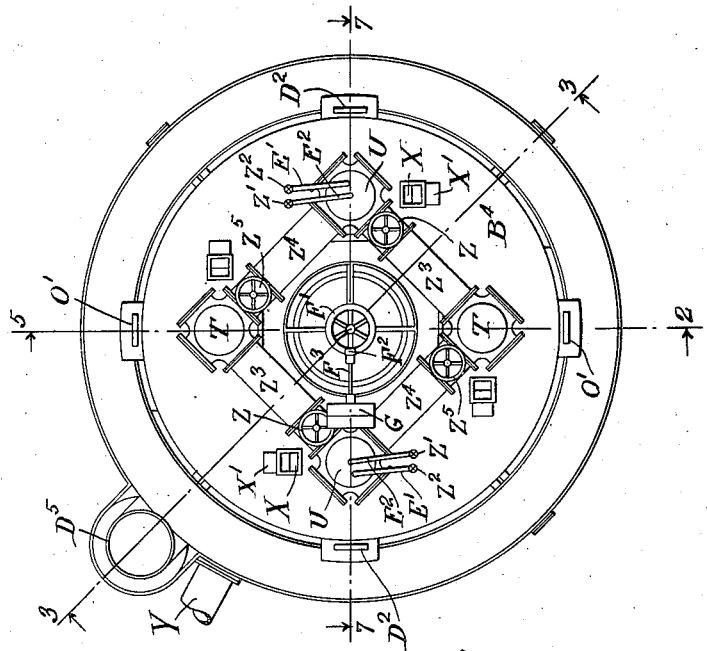
Figure 4:
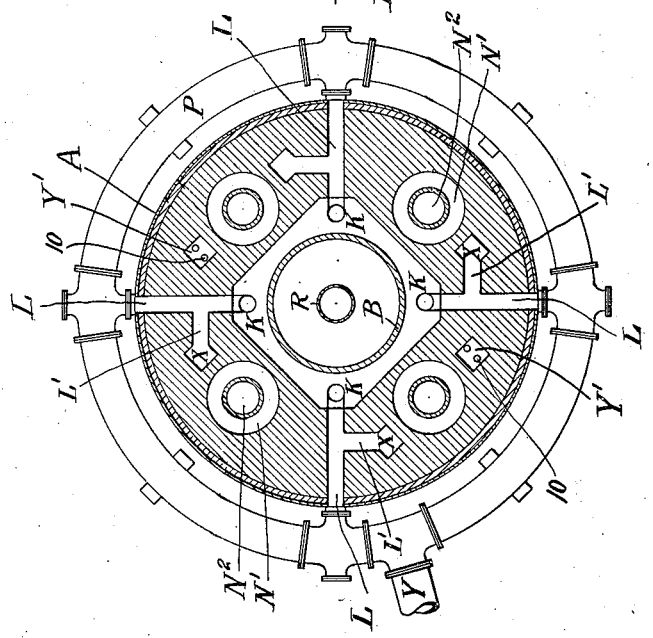
Figure 3:
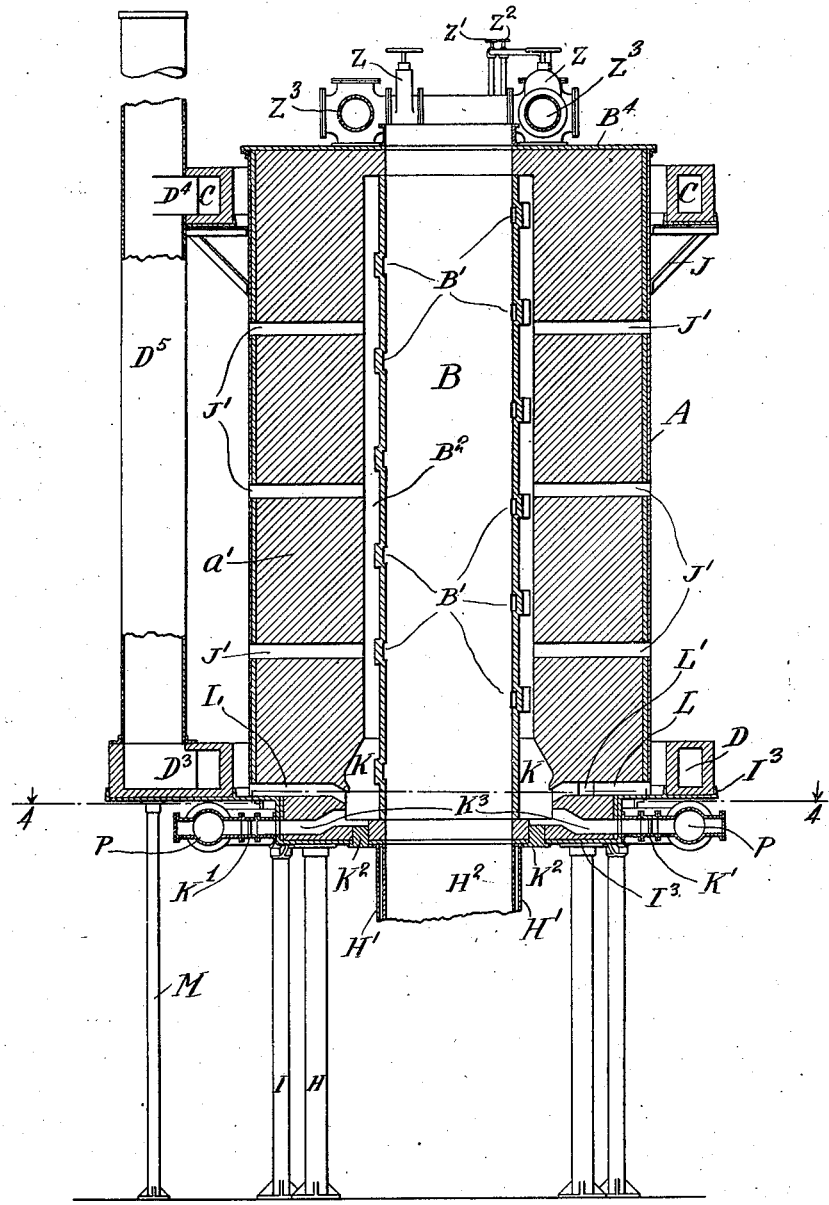
Figure 5:
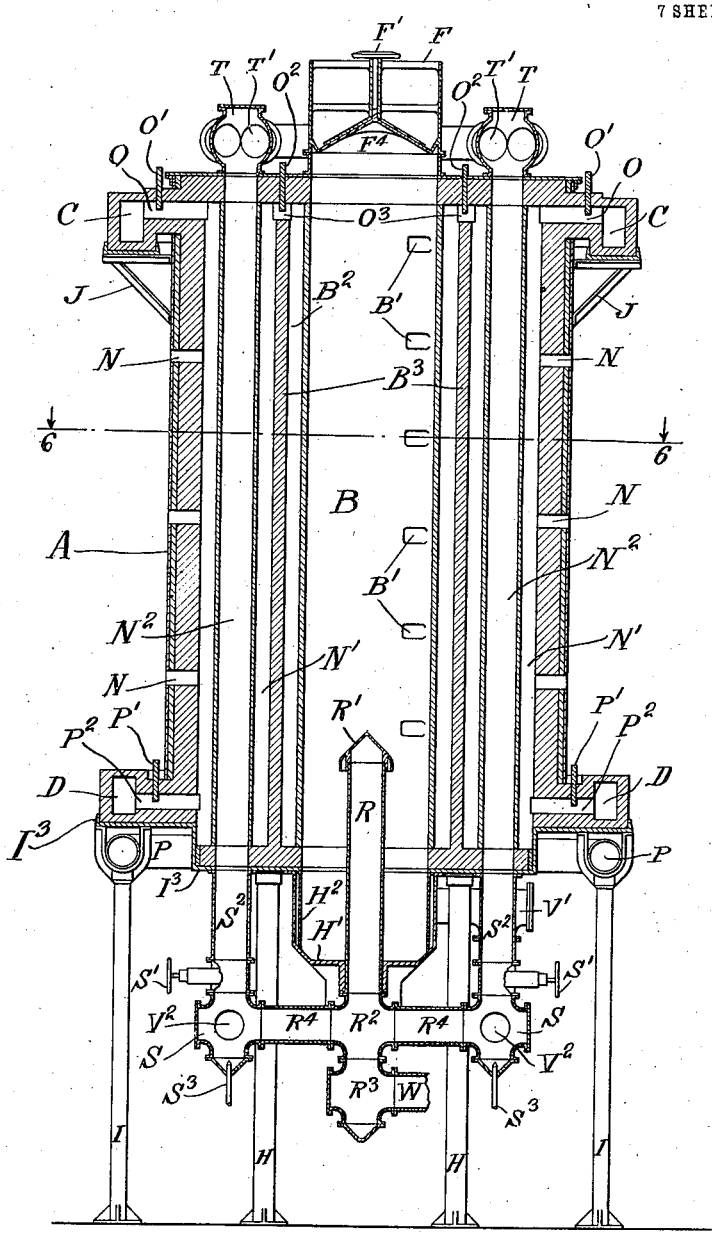
Figure 6:
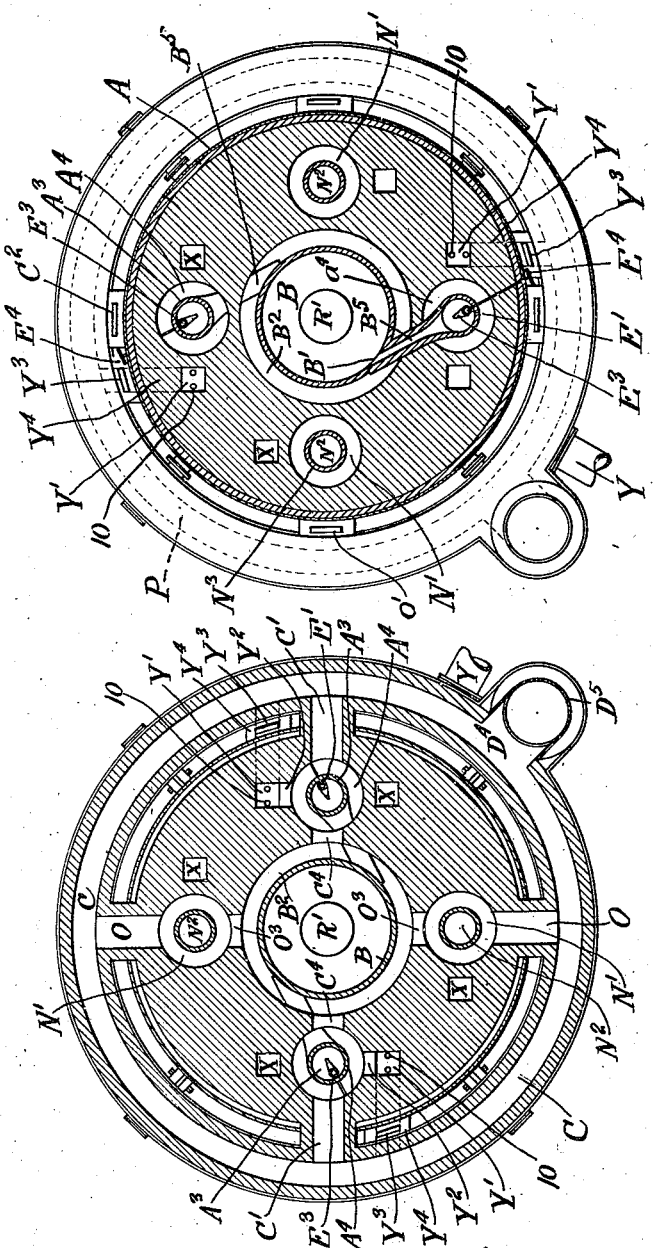
Figure 7:
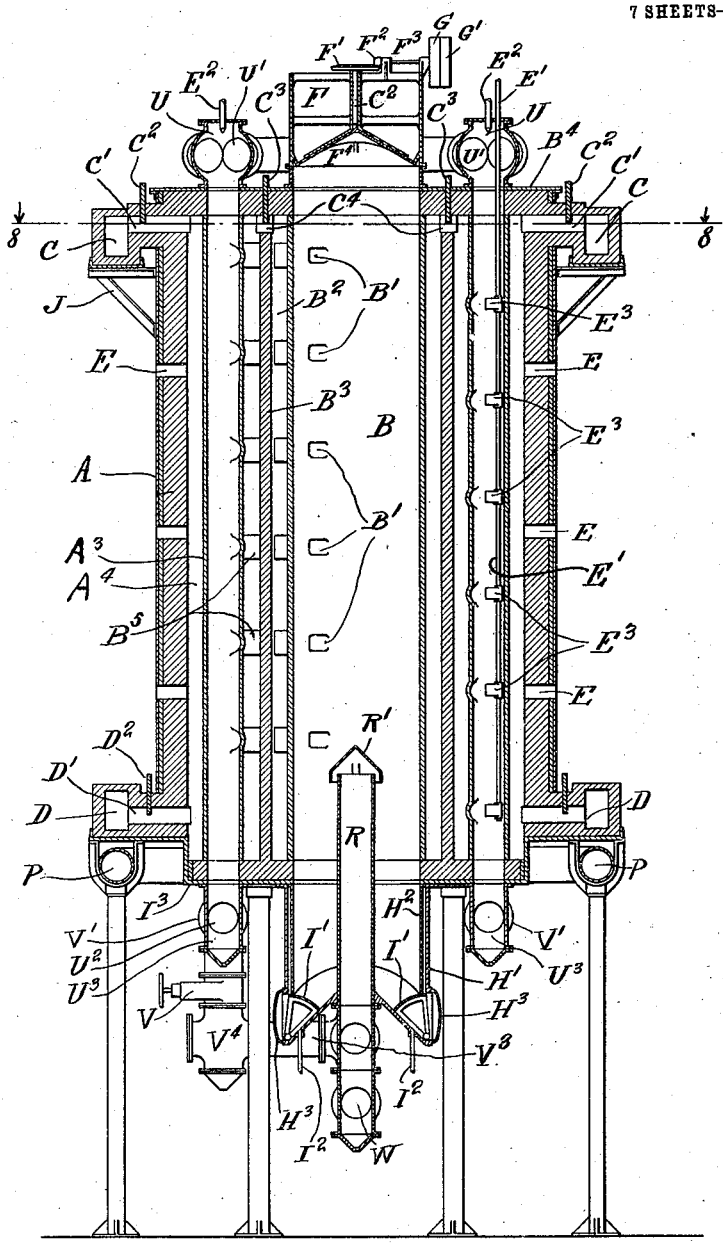

In the drawings, Figure 1 is a side elevation of the apparatus; Fig. 2 is a plan view of Fig. 1; Fig. 3 is a vertical sectional view on line 3—3 of Fig. 2 with the feeder, lower connections and a portion of the hopper removed; Fig. 4 is a horizontal sectional plan view on line 4—4 of Fig. 3; Fig. 5 is a vertical sectional view on line 5—5 of Fig. 2, looking in the direction of the arrows; Fig. 6 is a horizontal sectional plan on line 6—6 of Fig. 5; Fig. 7 is a vertical sectional view on line 7—7 of Fig. 2, looking in the direction of the arrows; Fig. 8 is a horizontal sectional plan view on line 8—8 of Fig. 7; Fig. 9 is a detail plan view showing a modified arrangement of gas connections; Fig. 10 is a side elevation of Fig. 9; Fig. 11 is an enlarged sectional side elevation of the feeder for the solid material; Fig. 12 is a plan view of the discharge gate; Fig. 13 is a side elevation of Fig. 12; Fig. 14 is a side elevation of a section of the lining of the hopper; Fig. 15 is a sectional side elevation of Fig. 14.

Referring to the drawings, A is the shell, or casing, having a base plate $I^3$ supported by the columns H, I and M. The shell A is covered by the plate $B^4$ supporting the feeder F. Within the shell A is the retort, or distilling chamber B, below the feeder F and provided at the bottom with a suitable hopper H', having discharge gates I' and doors $H^3$, and offtake pipe R with a suitable cover or hood R'. Surrounding the retort B is the heating chamber $B^2$ terminating at its lower portion in the combustion chambers K and communicating at its upper portion through the passages $O^8$ and $C^4$ with the vertically extending heating chambers N' and $A^4$ respectively. The passages $O^8$ are provided with dampers $O^2$ and the passages $C^4$ with the dampers $C^8$. Secondary air passages J' supply air to chamber $B^2$ and have dampers $J^2$ for the control of the secondary air as required. The passages L leading to the combustion chambers K have dampers and are also connected by the passages L' with the vertical secondary air flues X, which extend up through the top plate $B^4$ and have dampers X'.

P is a pipe around the lower portion of the apparatus having an inlet at Y, for supplying any suitable combustible gas through the valves K' and the passages $K^3$ to the combustion chambers K. The plugs $K^2$ may be removed and the apparatus provided with igniters when first starting if the combustible gas supplied through the pipe P is low in calorific power or not readily ignitible unless surrounded by hot walls.

The superheaters $N^2$ pass through the heating chambers N' and are connected at their lower ends by means of the connections $S^2$ to the valves S' and the fittings S (Fig. 5) and thence through the connections $R^4$ and the connection $R^2$ to the offtake pipe R. The offtake pipe R is also connected through the fitting $R^3$ to the outlet W, which may be connected to any suitable storage holder or to suitable cleansing and scrubbing apparatus as the case may require. This offtake W may also be connected in any suitable manner to the inlet opening Y, connecting with the pipe P, when it is desired to use the gas distilled to carry on the work of distillation.

The upper ends of the superheaters $N^2$ are connected by means of the fittings T, the connections $Z^3$ and valves Z to the fittings U which are connected to the injector flues $A^3$ passing through the heating chambers $A^4$. In the flues $A^3$ are located the pipes E' provided with the nozzles $E^3$. The injector flues $A^3$ are provided with the injector throats $B^5$ opening into the retort B through the openings B'. The nozzles $E^3$ are arranged centrally of the throats $B^5$ and force the gas contents of the injector flues $A^3$ into the retort B. These nozzles $E^3$ are controlled by means of handwheels $E^4$ at the sides of the apparatus, the adjustability of the nozzle orifice being too common in this art to require more detailed illustration. The pipes E' have valves as shown at $Z^2$. The lower ends of the injector flues $A^3$ have fittings $U^3$, which connect through the fittings V', the valves V, and the fittings $V^4$ and $V^3$ to the fittings S through the openings $V^2$, thus permitting the gases entering the offtake pipe R to pass through the openings $V^2$, and through said fittings and valves to the injector flues $A^3$, without passing through the superheaters $N^2$.

The heating chambers N' are connected at their lower ends by means of the passages $P^2$, dampered by the dampers P', to the flue D which extends around the apparatus, entering the stack $D^5$ through the opening $D^3$. These heating chambers N' are also connected at their upper ends through the passages O, dampered by the dampers O', to the flue C extending around the apparatus and connected through the opening $D^4$ to the stack $D^5$. In a similar manner the heating chambers $A^4$ are connected at their lower portion through the passages D', dampered by the dampers $D^2$, to the flue D. The heating chambers $A^4$ are also connected at their upper ends through the passages C', dampered by the dampers $C^2$, to the flue C, the flues C and D being connected as described with the stack $D^5$.

Entering the heating chambers N' are the passages N, suitably supplied with dampers as shown at $N^3$. The passages E communicating with the heating chamber $A^4$ are also supplied with suitable dampers. The passages Y' are connected with the heating chambers $A^4$ by means of the passages $Y^2$, and are also connected with the flue D by means of the passages $Y^4$ dampered by the dampers $Y^3$. These passages Y' have tubes 10 passing through them permitting the contents of the tubes to be heated to any desired extent before said tubes connect with the nozzles $E^3$ and the injector nozzles $E^2$, the latter being used to assist the gas in its travel as will be described. The pipes $I^2$ enter the hopper H' and are for the purpose of admitting steam which may circulate below the gates I' and between the hopper H' and its liner $H^2$, passing through the perforations $I^6$ of the gate I' shown in detail in Figs. 12 and 13, and also the perforations $H^4$ in the lining $H^2$ further shown in detail in Figs. 14 and 15.

Referring to Fig. 11 which shows a suitable type of feeder, F is a shell or casing having a flange $G^3$ and suitable arms $F^5$ connecting the shell F to the hub $C^4$, which supports the apron $F^6$. The hub $C^4$ carries a spindle $C^2$ provided with a cone shaped flange $F^4$ at its lower end and having a feather $G^5$ engaging the gear F'. The spindle $C^2$ is threaded at its upper portion $G^6$ and has threaded collars $L^2$ and $L^3$. The spindle $C^2$ may be hollow as shown by the opening $T^3$ for the insertion of a pipe having a suitable nozzle permitting a liquid hydrocarbon to be sprayed into the retort B. The collars $L^2$ and $L^3$ are for adjusting the relation of the spindle $C^2$ and the cone $F^4$ to the flange $G^3$, thereby regulating the width of the opening $G^4$.

In order to describe the method of operation of the apparatus, coal will be considered as the material to be distilled and the apparatus will be assumed up to heat. The supply of combustible gas for heating the retort B enters the opening Y in the pipe P from any suitable source and is distributed through the valves K' and the passages $K^3$ to the combustion chambers K. Secondary air is admitted through the dampers X', thence through the passages X, absorbing in its passage sufficient heat from the heating chambers N' and $A^4$ to permit ready combustion. The air enters the passages L through the openings L' and passes into the combustion chambers K, combining in these chambers with the combustible gas issuing below through the ducts $K^3$. The products of combustion complete, or incomplete, rise in the heating chamber $B^2$ and may receive, if necessary, an additional supply of secondary air in their passage through the passages J' having dampers $J^2$. From the top of the heating chamber $B^2$ the gases pass through the openings $O^3$ and $C^4$, controlled by the dampers $O^2$ and $C^3$ respectively, and thence into the heating chambers N' and $A^4$. From these heating chambers the gases may pass directly to the flue C and thence to the stack $D^5$, or by adjusting the dampers O', P', $C^2$ and $D^2$ any portion or all of the gases may pass to the flue D, which is also connected to the stack $D^5$. Furthermore a portion of the gases may pass through the openings $Y^2$ into the passages Y', and thence downward and through the passages $Y^4$ controlled by the dampers $Y^3$ into the flue D. Thus any desired temperature may be obtained in the retort B, the superheaters $N^2$, the injector flues $A^3$ and the ducts Y'.

The crushed coal is fed to the hopper F and in a continuous and uniform stream through the adjustable opening $G^4$ in the retort B near its inner periphery. This feed is obtained by driving the pulley G, which is connected to the driving shaft $F^3$, the pulley G' being loose. Connected to the shaft $F^3$ is the pinion $F^2$ engaging the gear F'. The gear F' engages the feather $G^5$ in the spindle $C^2$, thus driving the cone F⁴, resulting in a continual movement of the coal particles resting on the cone F⁴, which results in their gradually working through the opening G⁴, and falling into the retort B. It is obvious that the coal particles falling within the retort B will be continually in the presence of heat radiated by the hot walls of the retort until the particles are deposited in the hopper H'. The heat so applied effects the distillation or carbonization of the coal particle, and the gas so generated is allowed to issue from the retort through the offtake pipe R, and passes downward and out through the offtake opening W when the valves S' and V are closed.

One of the objects of this invention is to give an additional movement to the coal particles other than that imparted by gravity. In order to do this the valves S' may be opened and suitable gas under pressure supplied through the pipes S³ and a portion of the gases formed in the retort B thus induced to pass up through the superheaters N², thence through the valves Z to the injector flues A³. The gases may be further assisted in this path by admitting a suitable gas under pressure through the pipes E² equipped with suitable injector tips. The pipe E' being supplied with a suitable gas under pressure, the gas issuing from the nozzle E³ induces the gas entering the injector flues A³ to pass through the injector throats B⁵ into the retort B through the openings B'. These injector throats B⁵ are so arranged that the gases passing through them will enter the retort B tangentially to its inner periphery. These entering gases will produce a rotary movement of the falling coal particles, and in fact the entire contents of the retort is subjected to the resultant of two forces, namely: gravity, and the velocity of the entering gases, which gives a spiral movement to the coal particles, thus greatly increasing the lengths of the paths of travel over that which would be produced were they acted upon by gravity alone. As the entering gases are preheated, the carbonization of the coal particles is materially assisted and moving as they do on the interior surface of the heated retort these gases rapidly absorb the heat from the retort surface and supply it to the particles to be carbonized. The entire retort contents are kept at a practically uniform temperature through the churning effect produced by these tangentially directed streams of entering gases. The whirling motion produced, results in a certain concentrating effect on the coal particle; the heavier the coal particle the greater the centrifugal force produced and the closer it will travel to the heated surface of the retort. This concentrating effect is very desirable inasmuch as the distillation of gas is substantially a question of heat application, other conditions remaining the same.

The coal particles having been carbonized are deposited in the hopper H' immediately below the retort, and are removed periodically by opening the doors H³ and lifting the gates I'. Steam may be introduced through the pipe I², for producing water gas through the disassociation of the steam into its hydrogen and oxygen elements, the oxygen combining with the carbon of the deposited particle in the form of carbon monoxid or CO.

As is well known in the manufacture of gas, certain gases break up in the presence of excessive heat to form other combinations with a less commercial value. Therefore, where it is not desired to preheat the gases injected into the retort B to any great extent they may be introduced without passing through the superheaters N². This may be done by closing the valves S' and Z and opening the valves V. The gas may then pass through the connections R⁴ and S through the openings V² through the fittings V³ and V⁴, thence up through the valves V to the fittings V'; thence through the openings U² and the fittings U³ and directly into the injector flues A³ from whence they are injected as previously described.

When it is inadvisable to return the gases generated within the retort B, or where it is advisable to first denude these gases of some of their valuable constituents, the form of connections shown in Figs. 9 and 10 may be used. With this form of connections the gases entering the offtake pipe R may be allowed to issue through the offtake opening T², the valves M³ being closed. The suitable gases which it is desired to introduce into the retort B may enter through the opening T' from any source and are passed through the open valves M' and through the superheaters N², thence down through the injector flues A³. When it is not desired to preheat these gases to any great extent the valves M' may be closed and the valves M⁴ opened, in which case the gases entering the opening T' may pass directly through the valves M⁴ and enter the injector flues A³ without previous preheating. A partial opening of the valves M³ will produce any desired mixture of the gases generated within the retort B and the gases entering the inlet T'.

When it is desirable to add an enriching agent to the gases generated within the retort, such as is often the case where coal gas is manufactured, and it is necessary to enrich the gas distilled by the addition of a suitable amount of other gas, any suitable liquid hydrocarbon may be admitted directly to the retort B by means of an oil pipe and suitable sprays passed through the opening T³ in the spindle C². In this manner the oil particle, or particle of liquid hydrocarbon, is treated in the same manner as the coal particle. When it is desired to distil gas from a liquid hydrocarbon alone, the feeder may, of course, be omitted and an oil pipe with a suitable spray nozzle may be inserted alone, and otherwise the operation is the same as already described.

The apparatus need not contain one retort only as several retorts may be grouped together and either operated independently or in unison. The method of feed is also capable of variation, as the material may be admitted in a continuous stream near the inner periphery of the retort wall as shown by the drawing, or it may be admitted in one place. It may also be admitted with one or more of the entering streams of injected gases. The method of introducing the gases to the retort is also capable of variations, as a fan or suitable blower may be used instead of the injectors shown, in which case all of the induced gases would be placed under a slight pressure and the injector shown would not be necessary.

It will be observed that the offtake pipe R is preferably arranged substantially on the central axis of the retort B, so that gas may be taken off from the center rather than the sides where the particles are concentrated. The offtake pipe R may be of any desired length. The introduced gases may be directed horizontally into the retort as shown, or they may be directed at any desired angle with the horizontal.

This application being directed to apparatus, and the process being a divisible invention, the process is not the subject hereof, but of my separate application for Letters Patent.

I claim and desire to obtain by Letters Patent the following:

1. In apparatus for the manufacture of gas, the combination of a retort, means for externally heating the retort, means for introducing the material into the retort, and separate means acting within the retort for imparting a whirling motion to the material after its introduction into the retort.

2. In apparatus for the manufacture of gas, the combination of a vertically arranged heated retort, means for externally heating it, a feeder at the top of the retort and tangentially arranged nozzles throughout the height of the retort for subjecting the material in the retort to a whirling action.

3. In apparatus for the manufacture of gas, the combination of a vertically arranged heated retort, means for externally heating it, means for passing material downwardly through said retort by gravity and tangentially arranged nozzles for subjecting the material to a whirling action as it falls.

4. In apparatus for the manufacture of gas, the combination of a vertically arranged heated retort, a surrounding heating chamber therefor, feeding apparatus at the top of the retort, a gas outlet at the lower portion of the retort and means for subjecting the material in the retort to a whirling action.

5. In apparatus for the manufacture of gas, the combination of a vertical retort, means for heating the same, feeding apparatus at the top of the retort a gas outlet and hopper at the lower portion of the retort and means for subjecting the material in the retort to a whirling action.

6. In apparatus for the manufacture of gas, the combination of a heated retort, concentrically arranged means for externally heating it and means for subjecting the material in the retort to a whirling action.

7. In apparatus for the manufacture of gas, the combination of a vertical retort, a heating chamber surrounding the same, combustion chambers communicating with the heating chamber, secondary heating chambers communicating with said first named heating chamber, and means for subjecting the material in the retort to a whirling action.

8. In a pparatus for the manufacture of gas, the combination of a vertically arranged retort, means for feeding material thereto at the top, a gas outlet at the lower portion of the retort, a heating chamber surrounding said retort, combustion chambers communicating with said heating chamber, secondary heating chambers communicating with said first named heating chamber, superheaters adapted to be heated by said secondary chambers and means for subjecting the material in the retort to a whirling action.

9. In apparatus for the manufacture of gas, the combination of a vertically arranged retort, means for feeding material therethrough by gravity, a gas outlet at the lower portion of the retort, a heating chamber surrounding said retort, combustion chambers communicating with said heating chamber, a plurality of secondary heating chambers provided with superheating flues, a plurality of secondary heating chambers provided with injector flues and tangentially arranged injector nozzles for causing a whirling action of the material in the retort as it falls by gravity.

10. In apparatus for the manufacture of gas, the combination of a vertically arranged retort, means for heating the same, secondary heating chambers, superheating flues therein, means for introducing a portion of the gases formed in the retort into said superheating flues, and means for causing a whirling action of the material in the retort.

11. In apparatus for the manufacture of gas, the combination of a heated retort, means for feeding material to said retort and means for injecting streams of preheated gases into said retort tangentially, whereby a whirling motion of the material is produced.

12. In apparatus for the manufacture of gas, the combination of a retort, means for heating the retort, means for feeding the material into the retort and means for imparting to the material at a plurality of points within the retort and during its travel a whirling motion transverse to its progress.

13. In apparatus for the manufacture of gas, the combination of a vertical retort, means for heating the retort, means for feeding material to the retort, a gas outlet located substantially on the vertical axis of the retort, and means for giving the material in the retort a whirling action.

14. In apparatus for the manufacture of gas, the combination of a retort, means for externally heating it, means for feeding material in a substantially continuous stream in said retort, and means for injecting gases transversely to said stream and thereby controlling the path of travel and imparting a whirling motion to the material while in transit.

15. In apparatus for the manufacture of gas, the combination of a retort of circular cross section, means for externally heating the retort, means for feeding material to the retort and means for subjecting the material after it enters the retort to a whirling action, thereby securing greater uniformity through the centrifugal force.

16. In apparatus for the manufacture of gas, the combination of a retort, means for heating the retort, means for feeding material to the retort, means for causing a whirling motion of the material in the retort, and a gas outlet located at substantially the axis of the vortex of the whirling particles.

17. In apparatus for the manufacture of gas, the combination of a retort having means for heating it externally, means for feeding a continuous stream of finely divided material to be treated, and means for introducing a gaseous stream in a direction to subject the contents of the retort to centrifugal action.

In testimony whereof I have signed this specification in the presence of two subscribing witnesses; February 24, 1909.

WILBUR G. LAIRD.

Witnesses:
E. VAN ZANDT,
E. P. LA GAY.